United States Patent
Miyazaki

(10) Patent No.: US 7,308,837 B2
(45) Date of Patent: Dec. 18, 2007

(54) AUTOMATED MANUAL TRANSMISSION CONTROL APPARATUS

(75) Inventor: Takeshige Miyazaki, Anjyo (JP)

(73) Assignee: Aisin AI Co., Ltd., Nishio-Shi, Aichi-Ken (JP)

( * ) Notice: Subject to any disclaimer, the term of this patent is extended or adjusted under 35 U.S.C. 154(b) by 197 days.

(21) Appl. No.: 11/285,168

(22) Filed: Nov. 23, 2005

(65) Prior Publication Data

US 2006/0112777 A1 Jun. 1, 2006

(30) Foreign Application Priority Data

Nov. 30, 2004 (JP) ............................ 2004-345937

(51) Int. Cl.
*F16H 59/00* (2006.01)
(52) U.S. Cl. ........................ 74/335; 192/3.63
(58) Field of Classification Search ............. 74/336 R, 74/335, 333, 339; 477/125, 126; 192/3.57, 192/3.63
See application file for complete search history.

(56) References Cited

U.S. PATENT DOCUMENTS

| | | | | |
|---|---|---|---|---|
| 4,023,443 A | * | 5/1977 | Usui et al. .................. | 477/124 |
| 5,335,566 A | * | 8/1994 | Genise et al. ................ | 477/124 |
| 2004/0216549 A1 | * | 11/2004 | Shiomi et al. ............ | 74/473.12 |
| 2005/0072256 A1 | * | 4/2005 | Ibamoto et al. ................ | 74/339 |
| 2005/0230216 A1 | * | 10/2005 | Kouno et al. ............... | 192/53.1 |

FOREIGN PATENT DOCUMENTS

JP 2003-65434 3/2003

* cited by examiner

*Primary Examiner*—Rodney H. Bonck
*Assistant Examiner*—J K H
(74) *Attorney, Agent, or Firm*—Buchanan Ingersoll & Rooney PC

(57) ABSTRACT

An automated manual transmission control apparatus includes: a clutch; a transmission including: an input shaft; an output shaft; at least one forward shift stage gear; at least one synchromesh mechanism; and at least one reserve shift stage gear; an input shaft rotational speed sensor; a controlling means; a temporarily engaging means for performing a temporal engagement operation by which, the synchromesh mechanism is temporarily frictionally engaged with the at least one forward shift stage gear; and a reverse driving determining means for preventing a shift operation into the reverse shift stage when a vehicle speed obtained from the results of the input shaft rotational speed sensor exceeds a specified value at a time of the temporal engagement operation.

12 Claims, 3 Drawing Sheets

AUTOMATED MANUAL TRANSMISSION CONTROL APPARATUS

This application is on the basis of and claims priority under 35 U.S.C. § 119 to Japanese Patent Application 2004-345937, filed on Nov. 30, 2004, the entire content of which is incorporated herein by reference.

FIELD OF THE INVENTION

This invention relates to an automated manual transmission control apparatus for a vehicle. More particularly, the present invention pertains to an automated manual transmission control apparatus which prevents a shift operation into a reverse shift stage while a vehicle is running forward.

BACKGROUND

A vehicle driven by an engine, a motor, or the like includes a transmission for obtaining a speed, and a driving force, which both are appropriate to road conditions. The transmission is generally represented by a continuously variable transmission, an automatic transmission and a manual transmission. Generally, a manual transmission includes an input shaft for transmitting an input rotation of an engine or the like, an output shaft for transmitting an output rotation to a wheel, plural drive gears fixedly mounted on the input shaft, plural idle gears idly rotatably mounted on the output shaft and constantly meshed with the driving gears, a sleeve splined with a circumference of a hub, which is integrally rotated with the output shaft, and moved in a direction of an axis of the shaft, and a synchromesh mechanism, by which a desired shift stage is established by the sleeve synchronizingly engaged with a desired idle gear in response to a driver's operation.

According to a conventional manual transmission, a driver occasionally used to perform a shift operation as well as engaging and disengaging operations of a clutch for shifting. In a shift operation, a shift stage desired is selected and engaged with a sleeve moved in response to a shift lever operation by a driver. Recently, in order to reduce loads subjected to a driver, an automated manual transmission has been used, which basically has a manual transmission structure although performs a shift operation by means of an actuator which uses an oil pressure, or a motor, as a driving power source. One of the known automated manual transmissions is disclosed in JP2003-65434A. According to this automated manual transmission, a fully automated shift operation can be achieved by an automated manual transmission control apparatus, which controls the actuator, and a semi-automated shift operation can be also performed on the basis of a driver's intention.

In most cases, an automated manual transmission, that has a manual transmission as a basic structure, does not include a synchromesh mechanism for a reverse shift stage. If the transmission is shifted into a reverse shift stage by a mistake on the part of the driver while the vehicle is running in a forward direction, especially at a high speed, behavior of the vehicle suddenly changes and the driver is placed in a dangerous situation. In order to avoid such a situation, according to a conventional technology, when a vehicle forward driving or a brake pedal not being depressed is detected, for example, by a vehicle speed sensor provided on the output shaft, the wheel or the like, a shift operation into a reverse shift stage is effectively prevented.

However, a vehicle speed sensor has experienced difficulties in detecting the forward driving of the vehicle at a low speed because of the inadequacies of its detection capability. It on occasions may be dangerous if a shift stage is actually shifted into the reverse shift stage while the vehicle is running forward even at a low speed. Further, there may be a danger that each transmission component, such as a reverse shift stage gear, may incur serious damage. A mechanical reinforcement of the transmission for withstanding such damage and an additional loading of the synchromesh mechanism for the reverse shift stage would entail an increase in manufacturing costs of the vehicle.

A need thus exists for an automated manual transmission control apparatus which, without entailing an increase in the manufacturing costs of a vehicle, by preventing a shift operation into a reverse shift stage until the vehicle starts running at a lower speed than the above, can provide a higher degree of driving safety and reduce potential damage to a transmission. The present invention has been made in view of the above circumstances and provides such an apparatus.

SUMMARY OF THE INVENTION

According to an aspect of the present invention, an automated manual transmission control apparatus includes: a clutch capable of establishing and interrupting a transmission path of a driving force of a driving power source; a transmission including: an input shaft rotatable integrally with an output side of the clutch and capable of transmitting an input rotation; an output shaft capable of transmitting an output shaft rotation; at least one forward shift stage gear employed for driving a vehicle in a forward direction; at least one synchromesh mechanism for the at least one forward shift stage gear, the at least one synchromesh mechanism being capable of frictionally engaged with the at least one forward shift stage gear at the beginning of a shift operation and being capable of synchronizingly rotating with the at least one forward shift stage gear so as to establish at least one corresponding forward shift stage; and at least one reserve shift stage gear capable of establishing a reverse shift stage; an input shaft rotational speed sensor capable of detecting a rotational speed of the input shaft; a controlling means for controlling, on a basis of results detected by the input shaft rotational speed sensor, engaging and disengaging operations of the clutch and a gear engagement operation in the transmission; a temporarily engaging means for performing a temporal engagement operation by which, when the controlling means determines that an operation for selecting the reverse shift stage was performed, in a condition where the clutch is being disengaged to interrupt the transmission path of the driving force of the driving power source to the transmission, the synchromesh mechanism for the at least one forward shift stage gear is temporarily frictionally engaged with the at least one forward shift stage gear, wherein the input shaft is operated from the side of the output shaft; and a reverse driving determining means for preventing a shift operation into the reverse shift stage when a vehicle speed obtained from the results of the input shaft rotational speed sensor exceeds a specified value at a time of the temporal engagement operation.

According to another aspect of the present invention, a method of controlling a shift operation into a reverse shift stage implemented by an automated manual transmission control apparatus including: a clutch capable of establishing and interrupting a transmission path of a driving force of a driving power source; a transmission having: an input shaft rotatable integrally with an output side of the clutch and capable of transmitting an input rotation; an output shaft capable of transmitting an output shaft rotation; at least one forward shift stage gear employed for driving a vehicle in a forward direction; at least one synchromesh mechanism for the at least one forward shift stage gear, the at least one synchromesh mechanism being capable of frictionally engaged with the at least one forward shift stage gear at the beginning of a shift operation and being capable of synchronizingly rotating with the at least one forward shift stage gear so as to establish at least one corresponding forward shift stage; and at least one reserve shift stage gear capable of establishing a reverse shift stage; an input shaft rotational speed sensor capable of detecting a rotational speed of the input shaft; a controller for controlling engagement and disengagement operations of the clutch and shift operations in the transmission; and a vehicle speed sensor for detecting a vehicle speed, the method includes the steps of;

determining whether an operation for selecting a reverse shift stage in the transmission is selected;

when the operation for selecting the reverse shift stage in the transmission is selected, determining whether a vehicle speed detected by the vehicle speed sensor is less than, or equal to a minimum limit of detection of the vehicle speed sensor;

disengaging the clutch when the vehicle speed detected by the vehicle speed sensor is less than, or equal to the minimum limit of detection;

performing a temporal engagement operation of the synchromesh mechanism for the at least one forward shift stage gear, by which, in a condition where the clutch is being disengaged to interrupt the transmission path of the driving force of the driving power source to the transmission, the synchromesh mechanism for the at least one forward shift stage gear is temporarily frictionally engaged with the at least one forward shift stage gear;

determining whether a vehicle speed detected by the input shaft rotational speed sensor is equal to, or less than a specified value; and preventing reverse driving of a vehicle when the vehicle speed detected by the input shaft rotational speed sensor exceeds the specified value.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
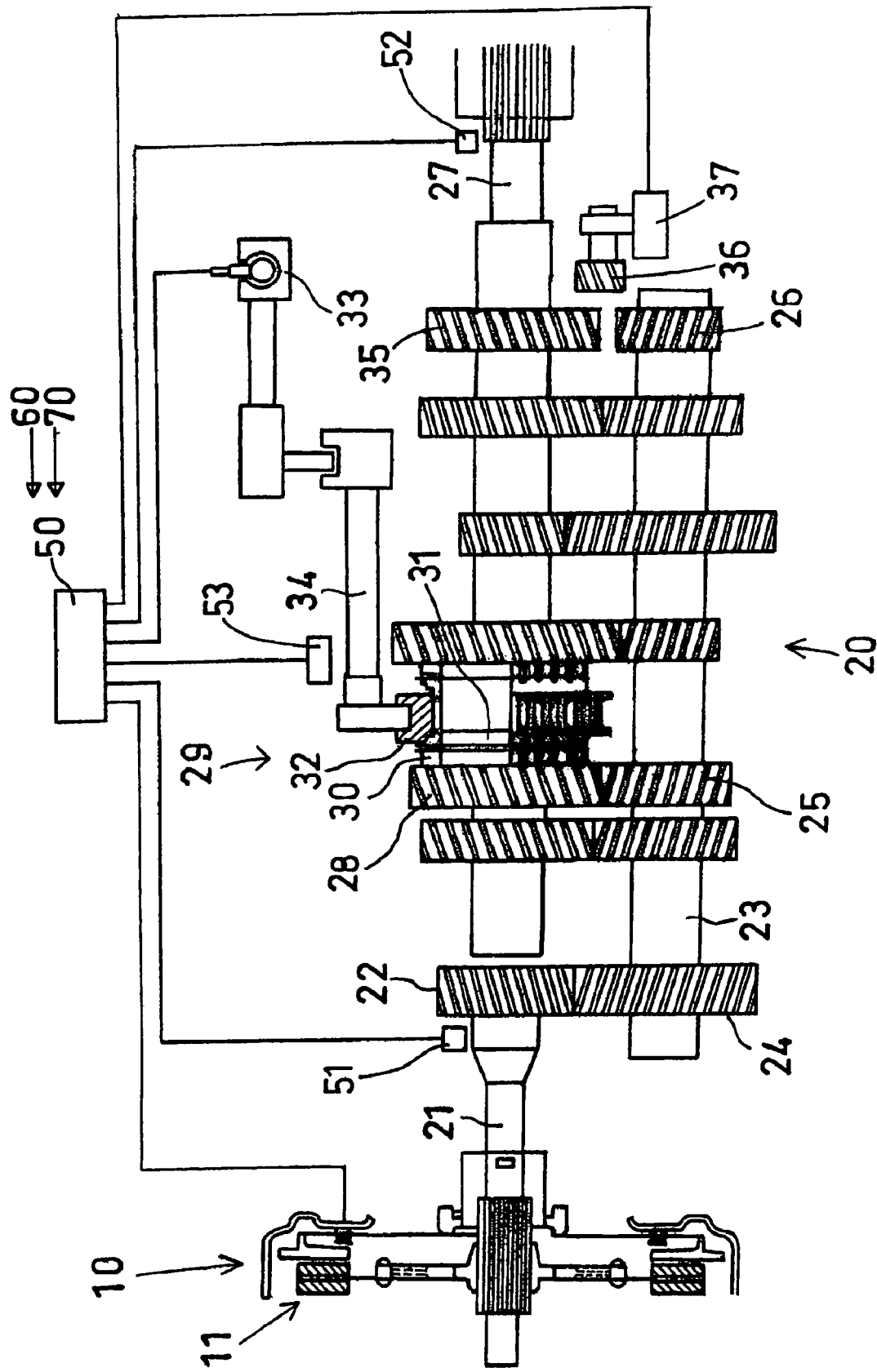
FIG. 1 is a schematic view of an automated manual transmission control apparatus according to an embodiment of the present invention.

An embodiment of the present invention will be explained with reference to illustrations of drawing figures as follows. A structure of an automated manual transmission control apparatus according to the embodiment of the present invention will be explained with reference to FIG. 1. The automated manual transmission control apparatus according to the embodiment of the present invention includes a clutch 10, a transmission 20, an input shaft rotational speed sensor 51, and an electronic control unit 50 (i.e., ECU) serving as a controller (i.e., controlling means), a temporarily engaging device 60 (i.e., temporarily engaging means), and a reverse driving determining device 70 (i.e., reverse driving determining means). The temporarily engaging device 60 and the reverse driving determining device 70 are performed by software of the electronic control unit 50. According to the embodiment of the present invention, attention is focused on, by providing the temporarily engaging device 60 (i.e., the temporarily engaging means) and the reverse driving determining device 70 (i.e., the reverse driving determining means), an occurrence of an erroneous shift operation into a reverse shift stage can be effectively prevented while a vehicle is running in a forward direction.

The clutch 10 transmits to the transmission 20, or interrupts, a driving force of an engine (not shown). For example, according to the embodiment of the present invention, the clutch 10 is a frictional clutch, which is positioned between the engine and the transmission 20, and is capable of transmitting a driving force of the engine by use of a frictional engagement force of two clutch discs 11 which face each other. The driving force is interrupted from being transmitted by disengagement of the clutch discs 11. An output side of the clutch 10 is connected to an input shaft of the transmission 20 and is rotatably movable in a disengaged condition of the clutch 10. A clutch actuator (not shown) controlled by the electronic control unit 50 activates engaging and disengaging operations of the clutch 10. According to the embodiment of the present invention, as far as an output side of the clutch 10 can be released and be freely rotatable when the clutch 10 is at a disengaged condition, a type of clutch, such as a frictional clutch, and an electromagnetic clutch, and a structure of clutch, such as the number of clutch discs, are not limited to the above.

The transmission 20 includes an input shaft 21, a counter shaft 23, an output shaft 27, gears for shift stages, and a synchromesh mechanism 29. As is illustrated in FIG. 1, according to the embodiment of the present invention, gears on the input shaft 21 is gear-meshed with gears on the output shaft 27 through gears on the counter shaft 23. However, the gears on the input shaft 21 can be directly gear-meshed with the gears on the output shaft 27.

The input shaft 21 can be connected to the output side of the clutch 10 and be rotatable integrally with the output side of the clutch 10 so as to transmit, to the transmission 20, an input rotation as a driving force of the engine. The input shaft 21 is provided with an input gear 22 and the counter shaft 23 is provided with a counter gear 24. The input gear 22 meshes with the counter gear 24 and transmits an input rotation, which is driving force, to the counter shaft 23. The counter shaft 23 includes a first shift stage drive gear 25, forward higher shift stage drive gears, and a reverse shift stage drive gear 26. The output shaft 27, which is capable of transmitting an output rotation from the transmission 20 to the side of vehicle wheels, includes an idly rotatable first shift stage idle gear 28 and higher shift stage idle gears. Hereinafter, a first shift stage shift operation is explained for forward shift stages, and similar explanations for higher shift stages are omitted.

In general, in a manual transmission, synchromesh mechanisms for respective plural forward shift stages are mounted on either an input shaft or an output shaft. When one of the plural forward shift stages is selected, the synchromesh mechanism for the selected shift stage is first frictionally engaged with a gear for the selected shift stage, wherein a rotational speed of the input shaft and a rotational speed of the output shaft come close. In a matter of time, after a synchronizing operation, the synchromesh mechanism is gear-meshed with the gear for the selected shift stage, wherein a predetermined shift stage is established in the transmission. In such circumstances, when another shift stage is selected, another synchromesh mechanism for this selected shift stage is frictionally engaged, wherein the another shift stage is established in the transmission. In a commonly used manual transmission, a synchromesh mechanism for a reverse shift stage is not provided. When a reverse shift stage is selected, a reverse shift stage gear is inserted between gears of the input and output shafts and is engaged therewith. In this case, the output shaft starts rotating in a reverse direction, wherein a reverse shift stage is established in the transmission.

According to the embodiment of the present invention, the output shaft 27 is provided with a first shift stage synchromesh mechanism 29 which is engageable with the first shift stage idle gear 28. The synchromesh mechanism 29 includes a tapered cone portion 30 provided on the first shift stage idle gear 28, a synchronizer ring 31, and a sleeve 32. The synchronizer ring 31 is rotated with the output shaft 27 and frictionally engaged with the cone portion 30 at an inner surface. The sleeve 32 slides in a direction of an axis of the shaft and pushes the synchronizer ring 31. The sleeve 32 further slides and meshes with the first shift stage idle gear 28 and the synchronizer ring 31, and the three of them are then integrally rotated, thereby establishing the first shift stage. The sleeve 32 is operated by an actuator 33 controlled by the electronic control unit 50 through driving force transmitting members such as a shift fork shaft 34.

A reverse shift stage driven gear 35 is fixed to the output shaft 27. A reverse driving of the vehicle is achieved by inserting a reverse intermediate gear 36 between the reverse shift stage driven gear 35 and the reverse shift stage drive gear 26 of the counter shaft 23. An operation of the reverse intermediate gear 36 is implemented by a reverse shift stage actuator 37 controlled by the electronic control unit 50.

In order to perform clutch operations (engagement and disengagement) and shift operations in the transmission, the electronic control unit 50 controls various actuators on the basis of an operation of the driver, and of a result detected by various sensors. The electronic control unit 50 includes a microcomputer, which incorporates, therein, output portions for driving various actuators, a calculation determining portion, a memorizing portion, and so on, and peripheral devices of the microcomputer. The electronic control unit 50 performs various controls for providing driving safety and riding comfort by exchanging information with an engine control device (not shown).

Various sensors include an input shaft rotational speed sensor 51 provided near the input shaft 21, a vehicle speed sensor 52 provided near the output shaft 27, and a stroke sensor 53 provided near the shift fork shaft 34. There are no limitations to the structure, and the method, of the input shaft rotational speed sensor 51. However, it is good that the input shaft rotational speed sensor 51 can detect a low vehicle speed, i.e., a low rotational speed of the input shaft 21. The vehicle speed sensor 52 detects a vehicle speed from a rotational speed of the output shaft 27, and the stroke sensor 53 detects a frictional engagement of the synchromesh mechanism 29 from a sliding position of the sleeve 32. The electronic control unit 50 receives electrical outputs of the sensors 51, 52, and 53 and obtains physical meaningful detection results by means of a predetermined calculation. Various actuators include the clutch actuator, the actuator 33 for the synchromesh mechanism of the forward shift stage, and the reverse shift stage actuator 37. The electronic control unit 50 controls the actuators 33 and 37 by transmitting control signals thereto.

The synchromesh mechanism 29 and the actuator 33 are not limited to the above as far as the following conditions are satisfied. First of all, an engagement operation of the synchromesh mechanism 29 operated by the actuator 33 is completed through two stages: 1) frictional engagement; and 2) gear-mesh after synchronization. Secondarily, the engagement operation can be interrupted, when needed, during the engagement operation, and can return to a condition prior to the start of the engagement operation.

An operation of the temporarily engaging device 60 is performed by software of the electronic control unit 50. The electronic control unit 50 performs a series of controls as follows. First, the electronic control unit 50 disengages the clutch 10, and operates the sleeve 32 through the actuator 33, then operates the synchromesh mechanism 29, and then stops an operation of the sleeve 32 when a frictional engaged condition of the synchromesh mechanism 29 is detected by the stroke sensor 53. According to the aforementioned series of controls, a rotation of the output shaft 27 is transmitted to the input shaft 21, and a temporarily engaged condition, in which the output shaft 27 and the input shaft 21 are rotated approximately synchronizingly, is established.

An operation of the reverse driving determining device 70 is also performed by software of the electronic control unit 50. When the driver performs an operation for selecting the reverse shift stage, the electronic control unit 50 creates the temporarily engaged condition, receives the electrical output of the input shaft rotational speed sensor 51, and calculates a vehicle speed by the predetermined calculation. If the vehicle speed exceeds a predetermined specified value, the electronic control unit 50 does not control the reverse shift stage actuator 37 and prevents reverse driving of the vehicle. Accordingly, the operation of the reverse driving determining device 70 is performed.

Figure 2:
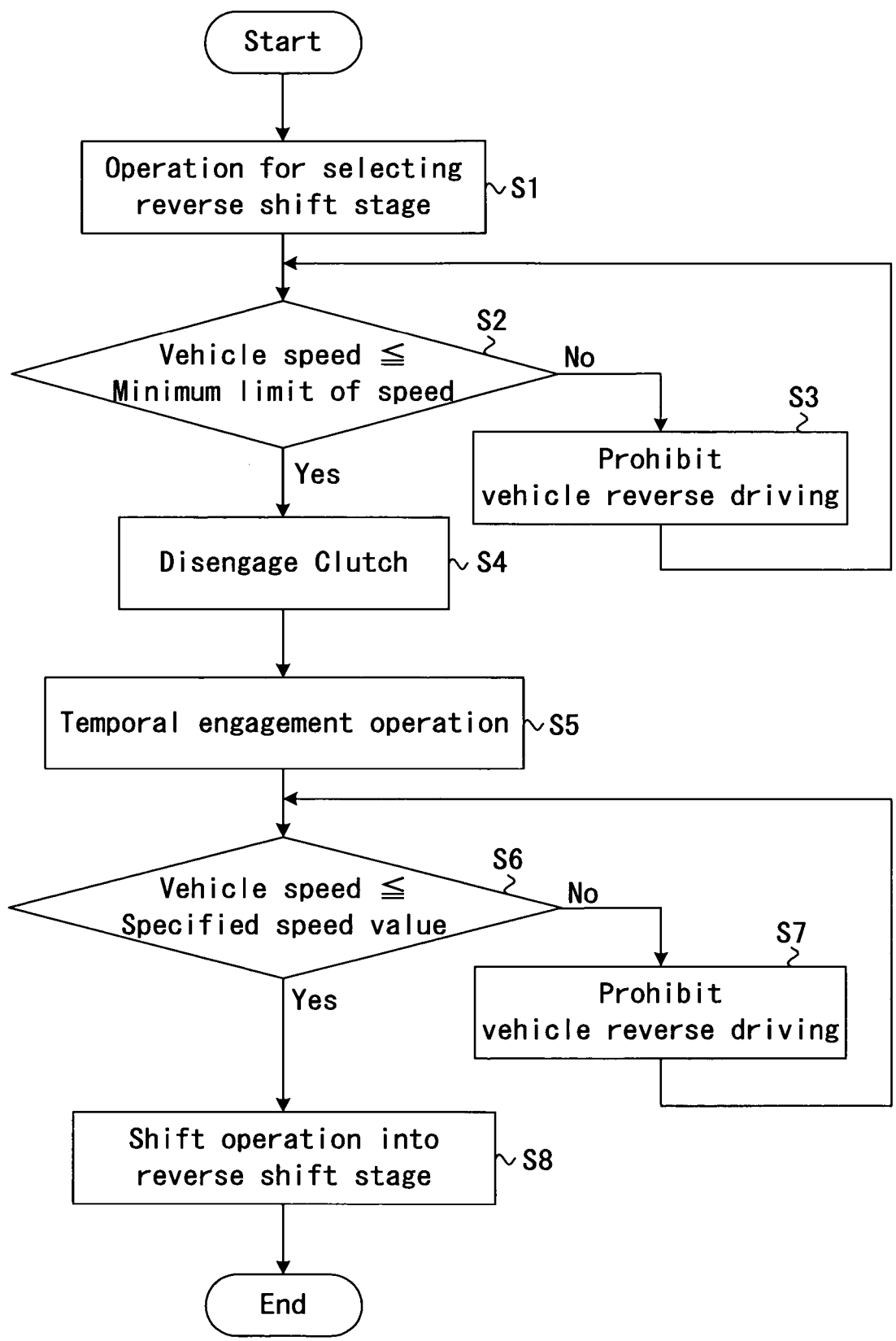
FIG. 2 is a flowchart for explaining an operation performed by the automated manual transmission control apparatus.

An operation of the automated manual transmission control apparatus according to the embodiment of the present invention is explained with reference to a flow chart shown in FIG. 2.

In step S1, the automated manual transmission control apparatus according to the embodiment of the present invention is activated when a driver performs an operation for selecting the reverse shift stage. In step S2, the electronic control unit 50 receives the results detected, for example, by the vehicle speed sensor 52 and determines whether the vehicle speed detected is less than, or equal to, a minimum limit of detection of the vehicle speed sensor 52. When a negative answer no is obtained in step S2, i.e., when the vehicle speed exceeds the minimum limit of detection, it is obvious that the vehicle is running in a forward direction, wherein, in step S3, the electronic control unit 50 prevents reverse driving of the vehicle. After a predetermined time has passed, the electronic control unit 50 again receives the results detected by the vehicle speed sensor 52. In contrast, when an affirmative answer yes is obtained in step S2, i.e., when the vehicle speed is equal to, or less than, a minimum limit of detection, the program proceeds to step S4, wherein the clutch 10 is disengaged.

In step S5, the electronic control unit 50 controls the actuator 33 to operate the sleeve 32 for part of the way and temporarily engages the synchromesh mechanism 29 of the first shift stage. In step S6, when a rotational speed of the input shaft is approximately synchronized with the output shaft because of the temporal engagement operation, the electronic control unit 50 receives the results detected by the input shaft rotational speed sensor 52 and determines whether the detected vehicle speed is less than, or equal to, a specified value. When a negative answer no is obtained in step S6, i.e., when the detected vehicle speed exceeds the specified value, the electronic control unit 50 is able to determine that the vehicle is running in a forward direction. Therefore, in step S7, the electronic control unit 50 prevents reverse driving of the vehicle. After a predetermined time has passed, the electronic control unit 50 again performs the temporal engagement operation in step S5. In contrast, when an affirmative answer yes is obtained in step S6, i.e., when the detected vehicle speed is substantially equal to, or less than, the specified value, the electronic control unit 50 is able to determine that the vehicle is substantially at a stationary condition. Therefore, in step S8, the electronic control unit 50 performs a shift operation into the reverse shift stage.

Figure 3A:
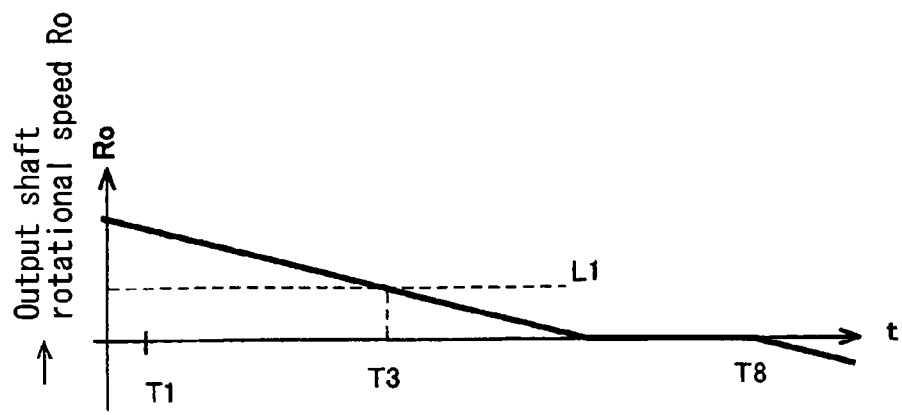
FIG. 3A is a timechart explaining a transit of an output shaft rotational speed over a period of time.
Figure 3B:
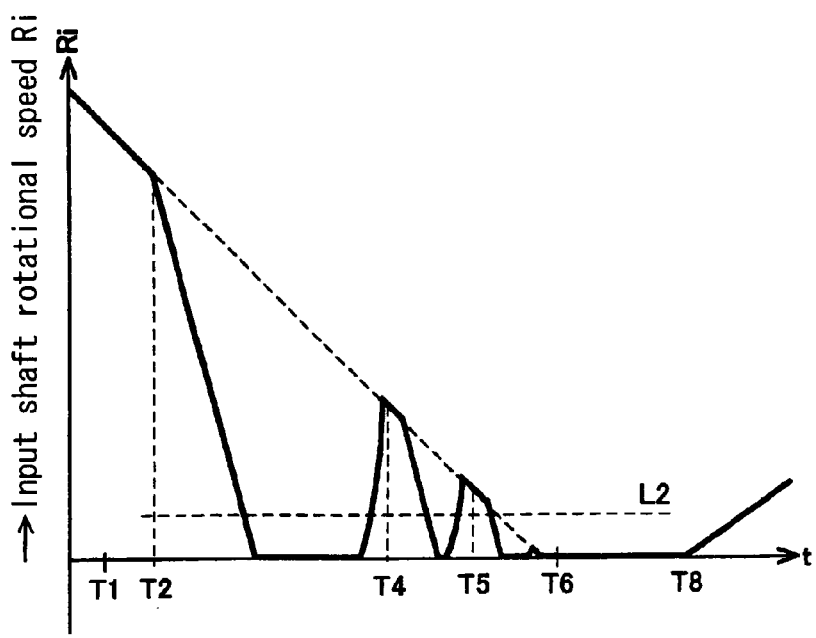
FIG. 3B is a timechart explaining a transit of an input shaft rotational speed over a period of time.
Figure 3C:
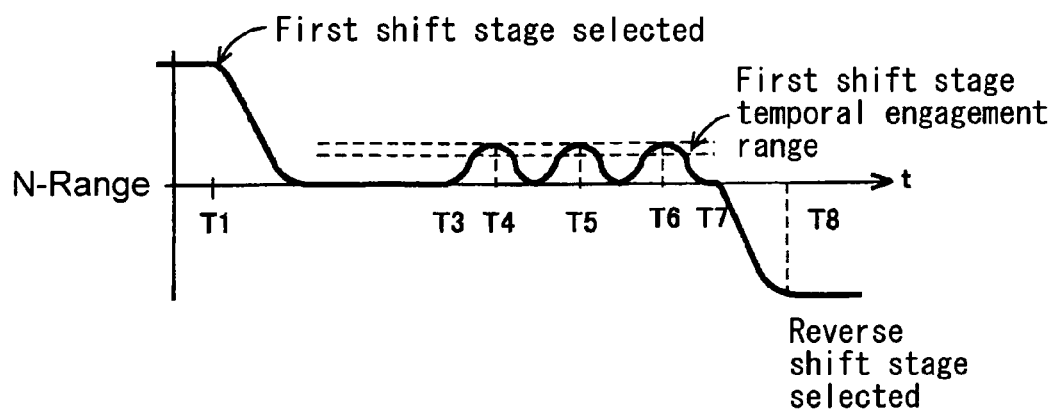
FIG. 3C is a timechart explaining of engaged and disengaged conditions of a shift stage over a period of time.

FIGS. 3A-3C show examples of an operation timing chart in a condition where the driver selects the reverse shift stage at a time of T1. At T1, the first shift stage is meshed and the vehicle is gradually decelerated. A vertical axis of FIG. 3A shows an output shaft rotational speed Ro, of FIG. 3B shows an input shaft rotational speed Ri, and of FIG. 3C shows engaged and disengaged conditions of the shift stage. A horizontal axis of FIGS. 3A-3C is a common time axis t. The input shaft rotational speed Ri is higher than the output shaft rotational speed Ro at a ratio corresponding to a transmission gear ratio of the first shift stage.

At the time of T1, in response to an operation for selecting the reverse shift stage, the first shift stage is released from being selected, i.e., a neutral shift stage is established in the transmission. The clutch 10 is then disengaged, i.e., is released from being connected to the input shaft 21 of the transmission. Then, the input shaft is released at a time of T2, and the input shaft rotational speed Ri is rapidly decelerated, as shown in FIG. 3B. On the other hand, the output shaft rotational speed Ro is gradually decelerated commensurately with the speed of the vehicle under inertia driving and reaches a minimum limit of detection L1 (e.g. about 5-15 km/h) of the vehicle speed sensor 52 at a time of T3. Accordingly, until the time of T3, likewise as a conventional method, the forward driving of the vehicle is determined by the vehicle speed sensor 52, and reverse driving of the vehicle is prevented.

As illustrated in FIG. 3C, the electronic control unit 50 serves as the temporarily engaging device 60 at the time of T3, and temporarily frictionally engages the synchromesh mechanism 29 of the first shift stage. Then the input shaft 21 is operated from the output shaft 27 through the counter shaft 23, and the input shaft 21 and the output shaft 27 are approximately synchronized at a time of T4. On this occasion, the electronic control unit 50 serves as the reverse driving determining device 70 and reverse driving of the vehicle is prevented because the input shaft rotational speed Ri detected by the input shaft rotational speed sensor 51 is higher than a specified value L2 (e.g. about 0-5 km/h). The aforementioned temporal engagement operation is performed repeatedly, and reverse driving of the vehicle is also prevented at a time of T5. A range of temporarily engagement shown in FIG. 3C depends on a length of a sleeve and a synchronizer ring in an axis direction.

At a time of T6, in which the next temporal engagement operation is implemented, the shift operation into the reverse shift stage is permitted because the input shaft rotational speed Ri is less than, or equal to, the specified value L2. The electronic control unit 50 then controls the reverse shift stage actuator 37 so as to operate the reverse intermediate gear 36 at a time of T7, and the reverse intermediate gear 36 is inserted between the reverse shift stage drive gear 26 and the reverse shift stage driven gear 35. Then, when the clutch 10 is engaged at a time of T8, the driving force of the engine is transmitted from the input shaft 21 to the output shaft 27 through the counter shaft 23 and the reverse shift stage gears 26, 36, and 35. Accordingly, reverse driving of the vehicle is performed.

As described above, according to a conventional technology, a shift operation into a reverse shift stage is performed under a vehicle forward driving condition at the time of T3, and the reverse intermediate gear 36 is forcefully inserted between the reverse drive gear 26 and the reverse driven gear 35. Because of this sudden shift operation from the forward shift stage into the reverse shift stage, a vehicle driving condition on occasions may become dangerous or unstable. In addition, the reverse gears 36, 26, and 35 may be on occasions applied with a large degree of stress, which may lead damages thereof. With the configuration of the automated manual transmission control apparatus according to the embodiment of the present invention, to the contrary, the shift operation into the reverse shift stage is performed at the time of T6 in a condition where the vehicle has substantially stopped. Thus higher degree of driving safety can be achieved and the damage to the transmission can be effectively reduced.

As described above, by the temporarily engaging means, in a condition where a clutch mechanism disconnects a transmission path of a driving force of an engine to a transmission, a synchromesh mechanism for any one of forward shift stages is temporarily frictionally engaged, wherein an input shaft of the transmission is operated from a side of an output shaft of the transmission. The input shaft is not restrained by the driving power source when the clutch mechanism is at a disengaged condition. The output shaft rotates at a rotational speed that corresponds to a speed of the vehicle under inertia driving. On this occasion, when the synchromesh mechanism of one of the forward shift stages is temporarily frictionally engaged, the rotational speed of the output shaft is transmitted to the input shaft. Then the input shaft and the output shaft are approximately synchronized, a condition which is herein referred to as a temporarily engaged condition. Under the temporarily engagement condition, the synchromesh mechanism is just frictionally engaged with the gear for the one of the forward shift stage, and has not been gear-meshed with the gear for the one of the forward shift stage. Therefore, the synchromesh mechanism under the temporarily engagement condition can be disengaged from the gear for the one of the forward shit stage in a relatively short period of time.

As described above, by the reverse driving determining means, under the temporarily engagement condition in which the synchromesh mechanism is being temporarily frictionally engaged, a vehicle speed is obtained from the results of the input shaft rotational speed sensor. If the vehicle speed detected exceeds the specified value, the reverse driving determining device prohibits a shift operation into the reverse shift stage. In the temporarily engaged condition, on the basis of a speed change ratio of the forward shift stage which is being temporarily engaged, the input shaft rotates at a rotational speed in response to the vehicle speed. Thus, the vehicle speed can be calculated by the rotational speed of the input shaft. The shift operation into the reverse shift stage is prohibited in the event of a vehicle forward driving condition in which the vehicle speed exceeds the specified value.

As described above, it is good that, when an operation for selecting a reverse shift stage is operated, for example a synchromesh mechanism for a first shift stage gear is controlled at a temporarily engaged condition. A vehicle speed sensor is normally attached to a wheel, or at a portion which rotates in synchronization with the wheel. For example, the input shaft rotational speed sensor can be effectively used in place of the vehicle speed sensor as a source of information for determining whether the vehicle is running in a forward direction or has substantially stopped. The reason for this is that a sensor for detecting a rotational speed is constrained by a lower limit within which it is capable of accurate detection. In other words, the input shaft, which is temporarily engaged, is rotated faster than the output shaft, at a rate corresponding to the transmission gear ratio. Therefore, by use of the input shaft rotational speed sensor, the forward driving of the vehicle can be accurately determined even within a vehicle lower speed range. From this point of view, it is good that the temporal engagement operation is performed in terms of a first shift stage, at which the input shaft rotates at the highest speed from among all capable shift stages under a certain degree of vehicle speed.

The temporarily engaging means can perform the temporal engagement operation repeatedly as long as the shift operation into the reverse shift stage is prohibited by the reverse driving determining device. When the reverse driving determining device prohibits the shift operation into the reverse shift stage as a result of a determination that the vehicle is running forward, it is necessary to await a deceleration of the vehicle speed. In this case, if frictional engagement by temporal engagement operation is continued, abrasion of the synchromesh mechanism on occasions occurs. Accordingly, it is good that the following process is intermittently performed, such that the temporal engagement operation is discontinued, a neutral shift stage is established in the transmission, and after a predetermined time has passed, the temporal engagement operation is again performed. Thereby, deceleration of a speed of a vehicle forward running can be detected without delay and the shift operation into the reverse shift stage can be quickly performed. Moreover, abrasion of the synchromesh mechanism can be effectively reduced.

The reverse driving determining means can compare the vehicle speed detected by the vehicle speed sensor to the minimum limit of detection of the speed sensor of the vehicle at a time when an operation for selecting the reverse shift stage is performed. If the vehicle speed exceeds the minimum limit of detection, the reverse driving determining device can prohibit the shift operation into the reverse shift stage. On the other hand, if the vehicle speed is less than, or equal to, the minimum limit of detection, the reverse driving determining device can perform the temporal engagement operation. If the vehicle sensor, which is inferior to the input shaft rotational speed sensor in its minimum limit of detection, determines that the vehicle is running forward, the shift operation into the reverse shift stage can be prohibited, without the need for the performing the temporal engagement operation.

Thus, comparing with a conventional technology, it is possible to prohibit a shift operation into a reverse shift stage at a lower vehicle speed, and a higher degree of driving safety can be achieved. Damage to the transmission can be also reduced. Moreover, because the temporarily engaging means and the reverse driving determining means can be achieved by adding new function into software of a conventional electronic control unit. Therefore, manufacturing costs of the vehicle are not increased.

This automated manual transmission control apparatus can be widely applied to general vehicles having a manual transmission which should be automatically operated.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An automated manual transmission control apparatus comprising:
   a clutch capable of establishing and interrupting a transmission path of a driving force of a driving power source;
   a transmission including:
      an input shaft rotatable integrally with an output side of the clutch and capable of transmitting an input rotation;
      an output shaft capable of transmitting an output shaft rotation;
      at least one forward shift stage gear employed for driving a vehicle in a forward direction;
      at least one synchromesh mechanism for the at least one forward shift stage gear, the at least one synchromesh mechanism being capable of frictionally engaged with the at least one forward shift stage gear at the beginning of a shift operation and being capable of synchronizingly rotating with the at least one forward shift stage gear so as to establish at least one corresponding forward shift stage; and
      at least one reserve shift stage gear capable of establishing a reverse shift stage;
   an input shaft rotational speed sensor capable of detecting a rotational speed of the input shaft;
   a controlling means for controlling, on a basis of results detected by the input shaft rotational speed sensor, engaging and disengaging operations of the clutch and gear engagement operations in the transmission;
   a temporarily engaging means for performing a temporal engagement operation by which, when the controlling means determines that an operation for selecting the reverse shift stage was performed, in a condition where the clutch is being disengaged to interrupt the transmission path of the driving force of the driving power source to the transmission, the synchromesh mechanism for the at least one forward shift stage gear is temporarily frictionally engaged with the at least one forward shift stage gear, wherein the input shaft is operated from the side of the output shaft; and
   a reverse driving determining means for preventing a shift operation into the reverse shift stage when a vehicle speed obtained from the results of the input shaft rotational speed sensor exceeds a specified value at a time of the temporal engagement operation.

2. The automated manual transmission control apparatus according to claim 1, wherein the at least one forward shift stage gear is a first shift stage gear for establishing a first shift stage, and the temporarily engaging means performs the temporal engagement operation by which the at least one synchromesh mechanism is temporarily engaged with the first shift stage gear when the controlling means determines that an operation for selecting the reverse shift stage was performed.

3. The automated manual transmission control apparatus according to claim 1, wherein the temporarily engaging means repeatedly performs the temporal engagement operation while the shift operation into the reverse shift stage is being prohibited by the reverse driving determining means.

4. The automated manual transmission control apparatus according to claim 2, wherein the temporarily engaging means repeatedly performs the temporal engagement operation while the shift operation into the reverse shift stage is being prohibited by the reverse driving determining means.

5. The automated manual transmission control apparatus according to claim 1, further comprising:
a vehicle speed sensor for detecting a vehicle speed,
wherein, when the controlling means determines that an operation for selecting the reverse shift stage was performed, the reverse driving determining means compares the vehicle speed detected by the vehicle speed sensor with a minimum limit of detection of the vehicle speed sensor, and
wherein the reverse driving determining means prohibits the shift operation into the reverse shift stage when the vehicle speed detected by the vehicle speed sensor exceeds the minimum limit of detection of the vehicle speed sensor, and the reverse driving determining means performs the temporarily engagement operation when the vehicle speed is less than, or equal to, the minimum limit of detection of the vehicle speed sensor.

6. The automated manual transmission control apparatus according to claim 2, further comprising:
a vehicle speed sensor for detecting a vehicle speed,
wherein, when the controlling means determines that an operation for selecting the reverse shift stage was performed, the reverse driving determining means compares the vehicle speed detected by the vehicle speed sensor with a minimum limit of detection of the vehicle speed sensor, and
wherein the reverse driving determining means prohibits the shift operation into the reverse shift stage when the vehicle speed detected by the vehicle speed sensor exceeds the minimum limit of detection of the vehicle speed sensor, and the reverse driving determining means performs the temporarily engagement operation when the vehicle speed is less than, or equal to, the minimum limit of detection of the vehicle speed sensor.

7. The automated manual transmission control apparatus according to claim 3, further comprising:
a vehicle speed sensor for detecting a vehicle speed,
wherein, when the controlling means determines that an operation for selecting the reverse shift stage was performed, the reverse driving determining means compares the vehicle speed detected by the vehicle speed sensor with a minimum limit of detection of the vehicle speed sensor, and
wherein the reverse driving determining means prohibits the shift operation into the reverse shift stage when the vehicle speed detected by the vehicle speed sensor exceeds the minimum limit of detection of the vehicle speed sensor, and the reverse driving determining means performs the temporarily engagement operation when the vehicle speed is less than, or equal to, the minimum limit of detection of the vehicle speed sensor.

8. The automated manual transmission control apparatus according to claim 4, further comprising:
a vehicle speed sensor for detecting a vehicle speed,
wherein, when the controlling means determines that an operation for selecting the reverse shift stage was performed, the reverse driving determining means compares the vehicle speed detected by the vehicle speed sensor with a minimum limit of detection of the vehicle speed sensor, and
wherein the reverse driving determining means prohibits the shift operation into the reverse shift stage when the vehicle speed detected by the vehicle speed sensor exceeds the minimum limit of detection of the vehicle speed sensor, and the reverse driving determining means performs the temporarily engagement operation when the vehicle speed is less than, or equal to, the minimum limit of detection of the vehicle speed sensor.

9. A method of controlling a shift operation into a reverse shift stage implemented by an automated manual transmission control apparatus including: a clutch capable of establishing and interrupting a transmission path of a driving force of a driving power source; a transmission having: an input shaft rotatable integrally with an output side of the clutch and capable of transmitting an input rotation; an output shaft capable of transmitting an output shaft rotation; at least one forward shift stage gear employed for driving a vehicle in a forward direction; at least one synchromesh mechanism for the at least one forward shift stage gear, the at least one synchromesh mechanism being capable of frictionally engaged with the at least one forward shift stage gear at the beginning of a shift operation and being capable of synchronizingly rotating with the at least one forward shift stage gear so as to establish at least one corresponding forward shift stage; and at least one reserve shift stage gear capable of establishing a reverse shift stage; an input shaft rotational speed sensor capable of detecting a rotational speed of the input shaft; a controller for controlling engagement and disengagement operations of the clutch and shift operations in the transmission; and a vehicle speed sensor for detecting a vehicle speed, the method comprising the steps of:
determining whether an operation for selecting a reverse shift stage in the transmission is selected;
when the operation for selecting the reverse shift stage in the transmission is selected, determining whether a vehicle speed detected by the vehicle speed sensor is less than, or equal to a minimum limit of detection of the vehicle speed sensor;
disengaging the clutch when the vehicle speed detected by the vehicle speed sensor is less than, or equal to the minimum limit of detection;
performing a temporal engagement operation of the synchromesh mechanism for the at least one forward shift stage gear, by which, in a condition where the clutch is being disengaged to interrupt the transmission path of the driving force of the driving power source to the transmission, the synchromesh mechanism for the at least one forward shift stage gear is temporarily frictionally engaged with the at least one forward shift stage gear;
determining whether a vehicle speed detected by the input shaft rotational speed sensor is equal to, or less than a specified value; and
prohibiting reverse driving of a vehicle when the vehicle speed detected by the input shaft rotational speed sensor exceeds the specified value.

10. The method of controlling a shift operation into a reverse shift stage according to claim 9 further comprising the steps of:

prohibiting reverse driving of a vehicle when the vehicle speed detected by the vehicle speed sensor exceeds the minimum limit of detection of the vehicle speed sensor.

11. The method of controlling a shift operation into a reverse shift stage according to claim 9 further comprising the steps of:

allowing reverse driving of a vehicle when the vehicle speed detected by the input shaft rotational speed sensor is equal to, or less than, the specified value.

12. The method of controlling a shift operation into a reverse shift stage according to claim 10 further comprising the steps of:

allowing reverse driving of a vehicle when the vehicle speed detected by the input shaft rotational speed sensor is equal to, or less than, the specified value.

* * * * *